United States Patent [19]
Mukai

[11] Patent Number: 5,638,135
[45] Date of Patent: Jun. 10, 1997

[54] DIGITAL COLOR ENCODER WITH IMPROVED CIRCUITRY

[75] Inventor: Takuo Mukai, Ikeda, Japan

[73] Assignee: Ricoh Company, Ltd., Tokyo, Japan

[21] Appl. No.: 628,129

[22] Filed: Apr. 4, 1996

[30] Foreign Application Priority Data

Apr. 6, 1995 [JP] Japan ................................ 7-081273
Oct. 12, 1995 [JP] Japan ................................ 7-290466

[51] Int. Cl.$^6$ ........................................... H04N 9/65
[52] U.S. Cl. ..................... 348/642; 348/660; 348/724
[58] Field of Search ................................ 348/642, 659, 348/660, 724; 358/23, 30; H04N 9/65, 9/67, 5/40

[56] References Cited

U.S. PATENT DOCUMENTS 4,982,179  1/1991  Ogawa ........................ 348/642

FOREIGN PATENT DOCUMENTS

| 56-37755 | 9/1981 | Japan | H04N 9/02 |
| 63-198497 | 8/1988 | Japan . | |
| 3-78837 | 12/1991 | Japan | H04N 9/64 |
| 5-30523 | 2/1993 | Japan | H04N 9/64 |

*Primary Examiner*—Sherrie Hsia
*Attorney, Agent, or Firm*—Cooper & Dunham LLP

[57] ABSTRACT

A digital encoder includes a matrix circuit for synthesizing chrominance signals R-Y and B-Y based on RGB signals sampled at a predetermined sampling frequency which is an integral multiple of a chrominance subcarrier; low-pass filters; a delay circuit; a switch circuit for reducing a frequency of an output from the low-pass filters; a digital modulator for subjecting a chrominance subcarrier to quadrature two-phase balanced modulation using an output signal from the switch circuit so as to output a chrominance signal having a sampling frequency 1/m that of the predetermined sampling frequency; a sampling frequency conversion circuit for multiplying the sampling frequency of the chrominance signal by a factor of m so as to output a chrominance signal having the predetermined sampling frequency; and an adder for computing a sum of the luminance signal delayed by the delay circuit, the chrominance signals output by the sampling frequency conversion circuit and a composite synchronizing signal so as to synthesize a composite video signal. In another construction, a digital color encoder of the present invention includes a matrix circuit for producing a luminance signal and chrominance signals by blending RGB signals using a predetermined ratio assigned to each color component; a trap filter for rejecting transmission of luminance signal components that correspond to a chrominance subcarrier frequency; a modulator for producing a chrominance signal having an arbitrary phase, based on the chrominance signals; an adder for producing a composite color signal by computing a sum of the luminance signal processed by the trap filter and the chrominance signal produced by the modulator.

9 Claims, 12 Drawing Sheets

DIGITAL COLOR ENCODER WITH IMPROVED CIRCUITRY

BACKGROUND OF THE INVENTION

1. Field of the Invention

The present invention relates to digital color encoders and, more particularly, to a digital color encoder which, connected to a color television set, converts RGB signals into a composite video signal using a digital system. The present invention also relates to a digital color encoder in which cross color is prevented from occurring even when the one-dimension Y/C separation is conducted at a receiving end of a television signal.

2. Description of the Prior Art

Figure 1:
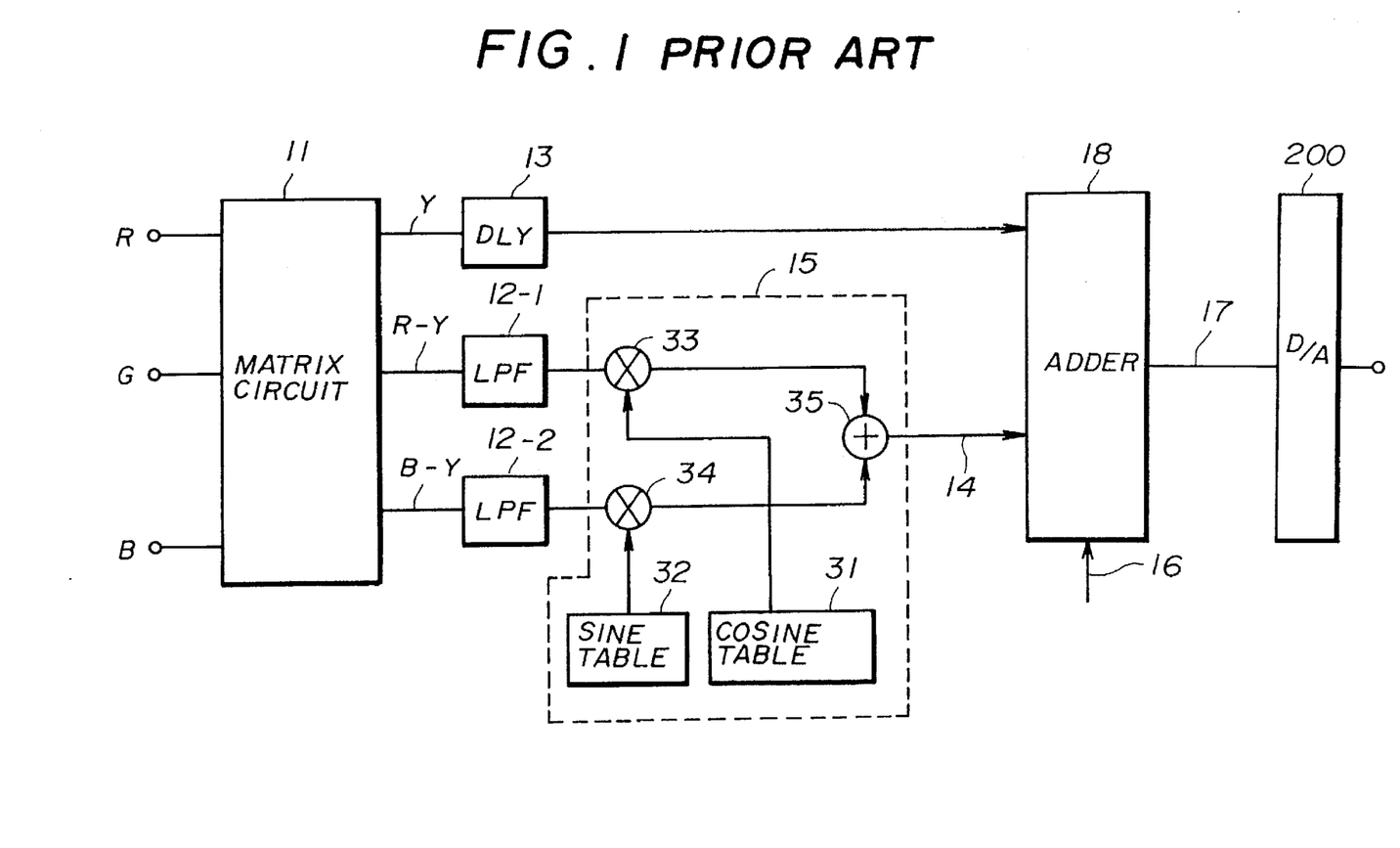
FIG. 1 is a block diagram showing an overall construction of a conventional digital color encoder.

A conventional digital color encoder is constructed as shown in FIG. 1. The digital color encoder comprises a matrix circuit 11 for blending RGB signals sampled at a sampling frequency which is an integral multiple of an integral fraction of a chrominance subcarrier frequency, the blending being done according to a predetermined ratio assigned to each color component. The matrix circuit 11 produces a luminance signal Y and color difference signals R-Y and B-Y. The digital color encoder also comprises low-pass digital filters (LPF) 12-1 and 12-2 for serving as band-reject filters, and a delay circuit (DLY) 13 for delaying the phase of the luminance signal Y by the same interval as a group phase delay interval provided by the low-pass filters 12-1 and 12-2. The distal color encoder also comprises a digital modulator 15 for subjecting the chrominance subcarrier to quadrature two-phase balanced modulation using the color difference signals output by the low-pass filters 12-1 and 12-2 and for outputting a chrominance signal 14; and an adder 18 for computing a sum of the luminance signal delayed by the delay circuit 13, the chrominance signal 14 output by the digital modulator 15, and a composite synchronizing signal 16 that conforms to the standard so as to produce a composite video signal 17. A digital-to-analog converter (D/A) 200 is responsible for subjecting the produced video signal 17 to digital-to-analog conversion.

The digital modulator 15 comprises a cosine table ROM 31 for storing a data table obtained by sampling a cosine waveform ((cos ωn·T), where ωn indicates an angular frequency and T indicates a sampling cycle) having the same frequency as the chrominance subcarrier (3.58 MHz), using the same sampling frequency as applied to the RGB signals; a sine table ROM 32 for storing a data table obtained by sampling a sine waveform (sin(ωn·T)) having the same frequency as the chrominance subcarrier, using the same sampling frequency as applied to the RGB signals; a multiplier 33 for multiplying an output signal of the low-pass filter 12-1 and an output signal of the cosine table ROM 31; a multiplier 34 for multiplying an output signal of the low-pass filter 12-2 and an output signal of the sine table ROM 32; and an adder 35 for computing a sum of output signals of the multipliers 33 and 34.

As has been described, in the balanced modulation performed by a digital modulator in the conventional digital color encoder, multipliers, a cosine waveform table ROM and a sine waveform table ROM are normally used. The sampling frequency in the balanced modulation is the same as the sampling frequency for the input RGB signals. Accordingly, the multipliers have to be operated at the same frequency as the sampling frequency. Moreover, if a single multiplier is to perform time division process, the single multiplier must be operated at twice the sampling frequency. For example, if the sampling frequency for the input signals (RGB signals) is 13.5 MHz, either two multipliers each operated at 13.5 MHz or a single multiplier operated at 27 MHz are required in order to yield both the R-Y signal and the B-Y signal.

Because high-speed multipliers are indispensable parts of the digital modulator in the conventional digital color encoder, the circuit scale involving the multipliers and the current consumption are inevitably large. Further, because the conventional digital color encoder requires waveform ROM tables adapted for the same sampling frequency as the sampling frequency for the input signals, the capacity of the ROMs and the circuit scale thereof are inevitably large.

Figure 2:
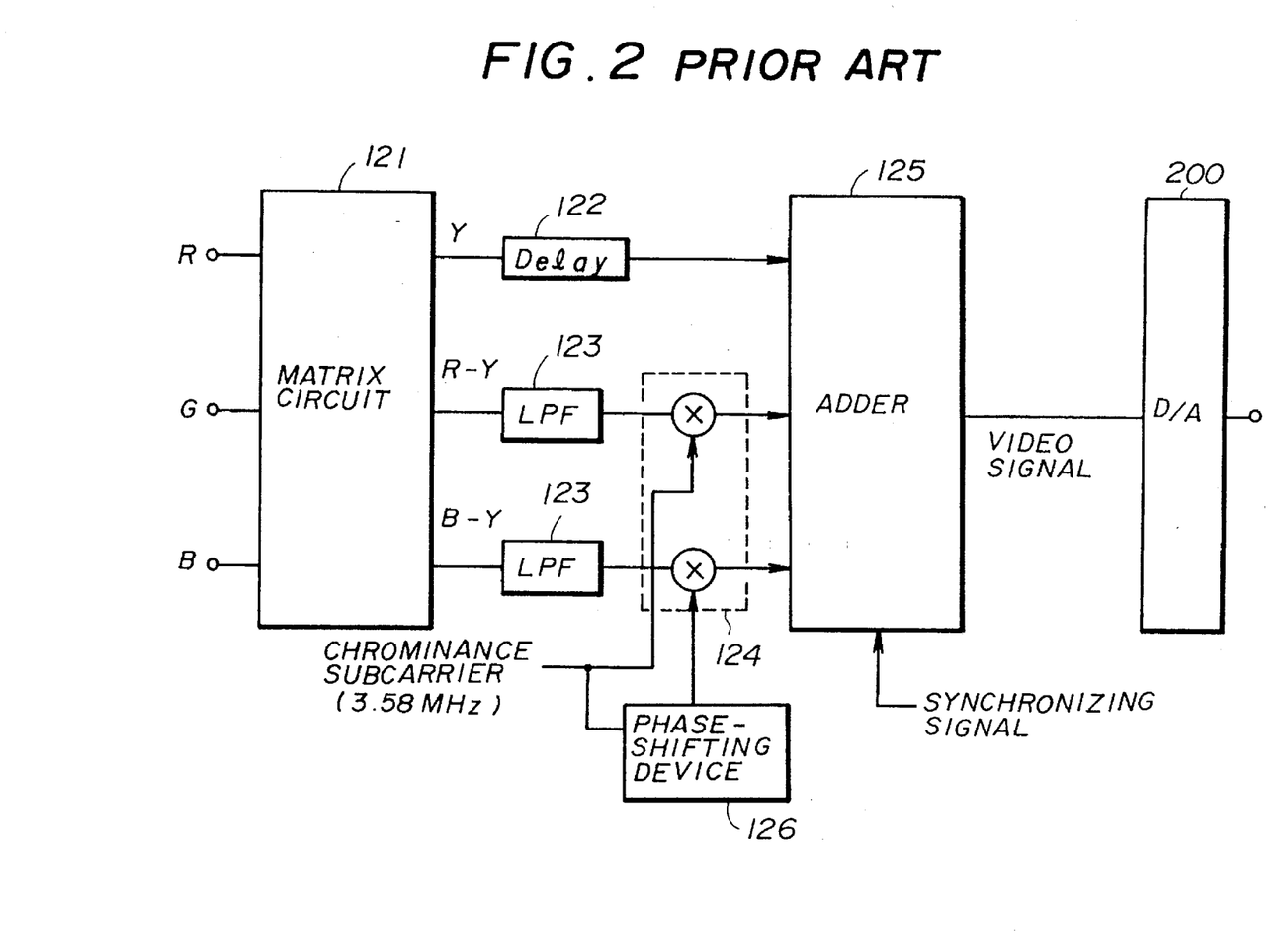
FIG. 2 is a block diagram showing another conventional digital color encoder.

A description will now be given, with reference to FIG. 2, of another problem with a conventional digital color encoder. FIG. 2 shows another conventional digital color encoder for producing an NTSC (composite) signal from RGB signals.

A matrix circuit 121 performs matrix operations for blending RGB signals sampled at a predetermined sampling frequency using predetermined ratios assigned to each color component so as to produce a luminance signal Y and color difference signals R-Y and B-Y. The relationship between the luminance signal, the color difference signals and a composite signal M is given by $$Y = 0.30R + 0.59G + 0.11B) \quad (1)$$

$$C_v = (R-Y)/1.14 \quad (2)$$

$$C_U = (B-Y)/2.03 \quad (3)$$

$$M = Y + C_v \cdot \cos\omega t + C_u \cdot \sin\omega t \quad (4)$$

Low-pass filters (LPF) 123 are responsible for band-rejection for the color difference signals R-Y and B-Y. A modulator 124 performs quadrature two-phase balanced modulation by modulating a chrominance subcarrier (3.58 MHz), using the color difference signal R-Y, and by modulating a chrominance subcarrier having its phase shifted by a phase-shifting device 126, using the color difference signal B-Y so that a chrominance signal is produced. An adder 125 computes a sum of the chrominance signal output from the modulator 124 and the luminance signal adjusted for its timing by a delay circuit 122, so as to produce a video signal.

A receiver that receives the video signal produced by the above-described digital color encoder is required to perform a decoding process called Y/C separation whereby the luminance signal and the chrominance signal are separated from the video signal.

It is known that one-dimensional Y/C separation by which the chrominance signal is separated by allowing the video signal to pass through a band-pass filter does not ensure a high-precision separation in that a component in a luminance signal bandwidth is brought into the chrominance signal in the neighborhood of the chrominance subcarrier frequency, thus causing cross color.

In one alternative Y/C separation (two-dimensional Y/C separation) which relies on a fact that the chrominance signal has alternately opposite phases from line to line, a signal obtained by subtracting a signal for one scanning line from a signal for another is caused to pass through the band-pass filter so as to obtain a chrominance signal in which cross color is reduced. In another alternative Y/C separation (three- dimension al Y/C separation) which relies on a fact that the chrominance signal has alternately opposite phases from frame to frame, a signal obtained by subtracting a signal for one scanning line from a signal for another is caused to pass through the band-pass filter so as to obtain a chrominance signal in which cross color is reduced. However, the circuit constructed according to any of these methods becomes complex and costs a lot.

SUMMARY OF THE INVENTION

Accordingly, it is a first object of the present invention to provide a digital color encoder in which the aforementioned problems are eliminated.

Another and more specific object of the present invention is to provide a digital color encoder in which a current consumption in the digital modulator is reduced and the circuit scale thereof is reduced.

Still another object of the present invention is to provide a digital color encoder in which cross color is not produced even of a receiver of the video signal uses the one-dimensional Y/C separation.

In order to attain the aforementioned objects, the present invention provides a digital color encoder for producing a composite color signal from RGB signals, comprising: input means for importing RGB signals sampled at a sampling frequency which is an integral multiple of a chrominance subcarrier frequency or an integral multiple of a fraction of the chrominance subcarrier frequency; signal synthesizing means for blending the RGB signals imported by the input means using a predetermined ratio assigned to each color component so as to produce a luminance signal and color difference signals; a low-pass filter for subjecting the color difference signals to band rejection; a band-reject digital filter for rejecting transmission of luminance signal components that correspond to the chrominance subcarrier frequency; modulating means for producing a chrominance signal having an arbitrary phase, based on the color difference signals; and adding means for synthesizing a composite color signal by computing a sum of the luminance signal processed by the band-reject digital filter and the chrominance signal produced by the modulating means. According to this digital color encoder, the luminous signal components in the neighborhood of the chrominance subcarrier frequency are prevented from being included in the chrominance signal in decoding a composite color signal. Accordingly, even if one-dimension Y/C separation is carried out in a receiver, cross color is prevented from occurring.

By outputting, separately from the composite color signal, the luminance signal output from the signal synthesizing means and the chrominance signal output from the modulating means, the digital color encoder is adapted for the S-terminal standard in which the luminance signal and the chrominance signal are transmitted in different channels. Use of the luminance signal not processed by the band-reject digital filter prevents a drop in contrast or resolution from occurring.

By employing a construction whereby the luminance signal processed by the band-reject digital filter or the luminance signal not processed by the band-reject digital filter is selectively fed to the input of the adder, a user can choose between two requirements, that is, prevention of cross color and prevention of a drop in contrast or resolution.

In order to achieve the aforementioned objects, the present invention provides a digital color encoder connected to a color television set, comprising: signal synthesizing means for blending RGB signals sampled at a predetermined sampling frequency which is a/b times a chrominance subcarrier frequency, where a and b are integers, so as to produce a luminance signal and two color difference signals; low-pass filters for subjecting the color difference signals to band rejection; switch means for reducing a size of color difference data in the color difference signals subjected to band-rejection by the low-pass filters so as to convert a sampling frequency of the color difference signals into 1/m of the sampling frequency, where m is an integer; modulating means for synthesizing a chrominance signal having an arbitrary phase, based on the two color difference signals having a converted sampling frequency; sampling frequency conversion means for converting a frequency of the chrominance signal into the predetermined sampling frequency; and adding means for synthesizing a composite video signal by computing a sum of the luminance signal, chrominance signal having the predetermined sampling frequency and a composite synchronizing signal that conforms to the standard. According to the digital color encoder of the present invention, a load imposed on the modulating means in a multiplication process is reduced, and a current consumption in multipliers constituting the modulating means is reduced. Further, table ROMs for storing data to be multiplied by the chrominance signals may have smaller capacity as compared to the table ROMs of the conventional modulating means. Thereby, the circuit scale of the modulating means can be reduced as compared to the conventional modulating means.

In one preferable embodiment, the modulating means includes two multipliers operated at 1/m of the predetermined sampling frequency in processing the two color difference signals. According to this aspect of the present invention, it is not necessary to provide high-speed parallel processing multipliers like those of the conventional modulating means. Therefore, reduction in current consumption and a size of the circuit scale of the modulating means can be attained.

Preferably, the modulating means includes a multiplier operated at the predetermined sampling frequency in processing the two color difference signals using a time-division scheme. In accordance with this aspect of the present invention, it is not necessary to provide two high-speed multipliers for respective chrominance signals. In this way, reduction in current consumption and a size of the circuit scale of the modulating means can be attained.

In still another embodiment, the sampling frequency conversion means multiplies the sampling frequency of the chrominance signal by a factor of n instead of m, where n is an integer, the sampling frequency conversion means comprising luminance signal frequency conversion means for multiplying the sampling frequency of the luminance signal by a factor of n/m so that the sampling frequencies of the luminance signal and the chrominance signal are harmonized before the sum is produced by the adding means. According to this aspect of the present invention, the composite vide signal can be synthesized smoothly. Particularly, setting n to a value greater than m ensures that a stable chrominance subcarrier is output.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 3:
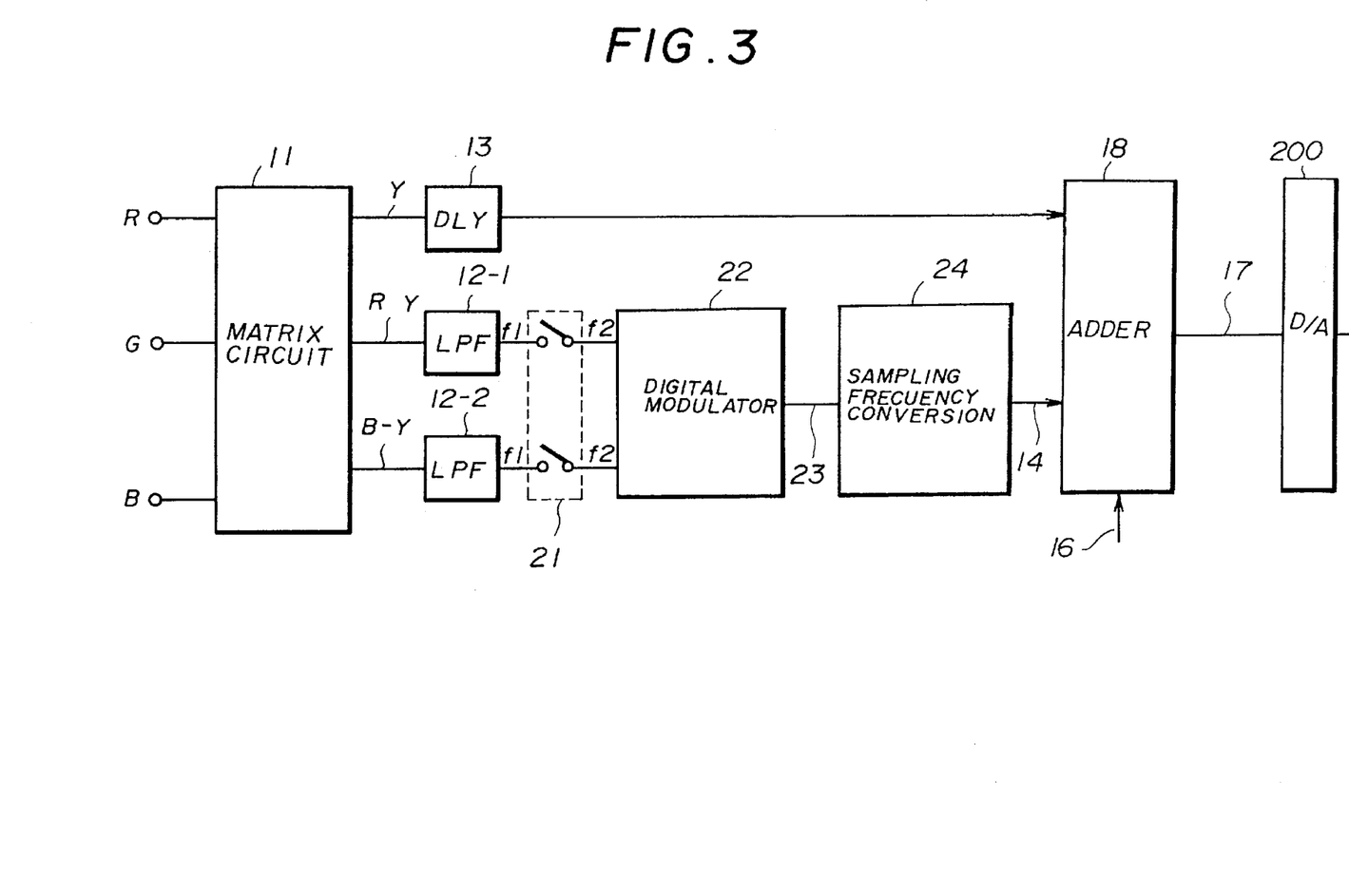
FIG. 3 is a block diagram showing an overall construction of a digital color encoder according to a first embodiment of the present invention.

FIG. 3 shows an important part of a digital color encoder according to a first embodiment of the present invention. In FIG. 3, those components that are the same as the components of FIG. 1 are designated by the same reference numerals.

The digital color encoder of FIG. 3 comprises a matrix circuit 11 for blending RGB signals sampled at a sampling frequency which is an integral multiple of a integral fraction of a chrominance subcarrier frequency so as to produce color difference signals R-Y and B-Y, the blending being done according to a predetermined ratio assigned to each color component; the low-pass filters 12-1 and 12-2 serving as band-reject filters for the color difference signals R-Y and B-Y; a delay circuit (DLY) 13 for delaying the phase of the luminance signal Y by the same group phase delay provided by the low-pass filters 12-1 and 12-2; and a switch circuit 21 for reducing the frequency of the color difference signals output by the low-pass filters 12-1 and 12-2 by a factor of m, where m is an integer. Further, the digital color encoder as shown in FIG. 3 comprises a digital modulator 22 for subjecting a chrominance subcarrier to quadrature two-phase balanced modulation using an output signal of the switch circuit 21 and for outputting a chrominance signal 23 having its frequency reduced to 1/m of the sampling frequency; a sampling frequency conversion circuit 24 for multiplying the frequency of the chrominance signal 23 by a factor of m and for outputting a chrominance signal 14 having a frequency equal to the original sampling frequency; and an adder 18 for computing a sum of the luminance signal delayed by the delay circuit (DLY) 13, the chrominance signal 14 output by the sampling frequency conversion circuit 24 and the composite synchronizing signal 16 that conforms to the standard so as to produce a composite video signal 17.

The digital color encoder of FIG. 3 is different in circuit configuration from the conventional digital color encoder in that there are additionally provided the switch circuit 21 for reducing the frequency f1 of the color difference signals output by the low-pass filters 12-1 and 12-2 by a factor of m so as to produce the color difference signal having the frequency f2 (=f1/m) and a frequency conversion circuit 24 for returning the frequency of the chrominance signal to the original sampling frequency by multiplying the frequency of the output signal of the digital modulator 22 by a factor of m, and in that the digital modulator 22 subjects the chrominance subcarrier to digital balanced modulation using the color difference signal having a frequency (f2) reduced to 1/m of the original sampling frequency by the switch circuit 21. The other aspects of the circuit construction are the same as those of the conventional circuit (FIG. 1).

In the following description, it is assumed that the sampling frequency f1 of the input signal is equal to 13.5 MHz, and m=2.

Figure 4:
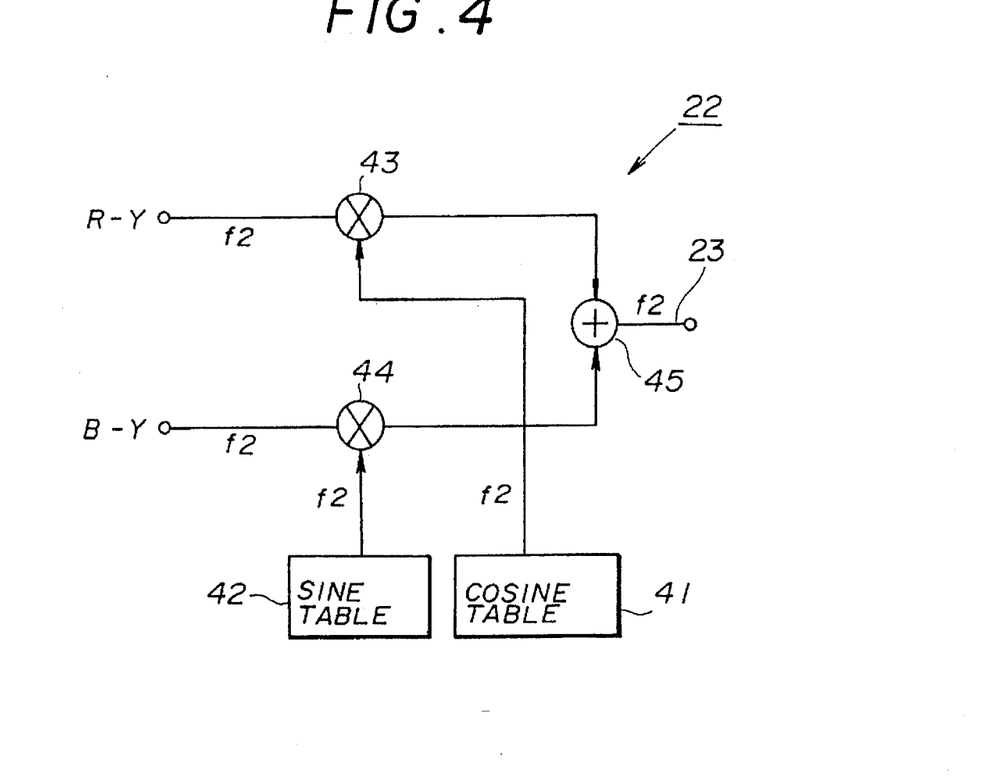
FIG. 4 is a block diagram showing a construction of a digital modulator of FIG. 3.

FIG. 4 shows a construction of the digital modulator 22 of FIG. 3. The digital modulator 22 comprises a cosine table ROM 41 for storing a data table obtained by sampling a cosine waveform ((cos $\omega n \cdot T$), where $\omega n$ indicates an angular frequency and T indicates a sampling cycle) having the same frequency as the chrominance subcarrier (3.58 MHz), using a sampling frequency which is ½ (=1/m) of the sampling frequency as applied to the RGB signals; a sine table ROM 42 for storing a data table obtained by sampling a sine waveform (sin($\omega n \cdot T$)) having the same frequency as the chrominance subcarrier, using a frequency which is ½ of the sampling frequency as applied to the RGB signals; a multiplier 43 for multiplying the chrominance signal R-Y having a frequency f2 reduced to ½ of the original sampling frequency by the switch circuit 21 by an output signal (having the frequency f2) of the cosine table ROM 41; a multiplier 44 for multiplying the chrominance signal B-Y having the frequency f2 reduced to ½ of the original sampling frequency by the switch circuit 21 by an output signal (having the frequency f2) of the sine table ROM 42; and an adder 45 for adding output signals of the multipliers 43 and 44 so as to output the chrominance signal 23 having the frequency f2.

Figure 5:
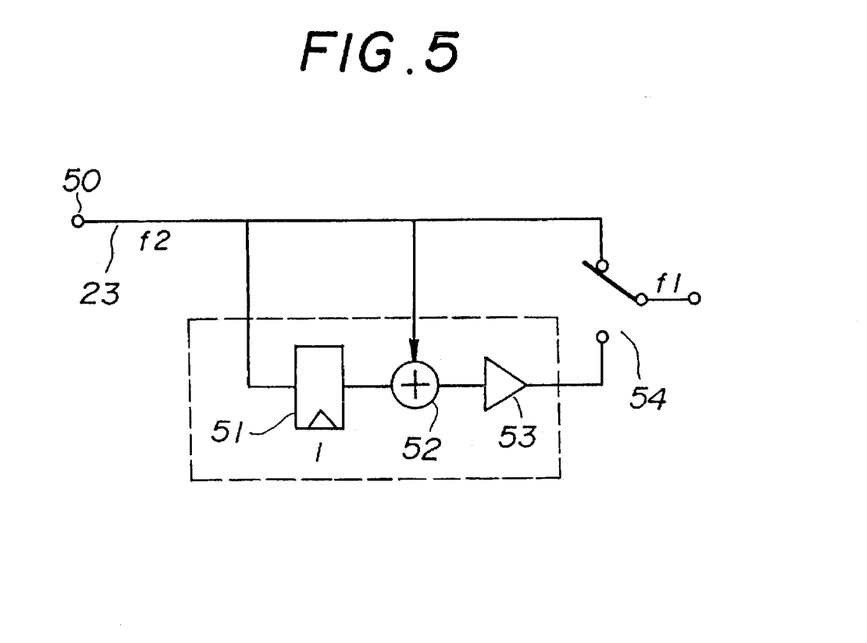
FIG. 5 is a block diagram showing a construction of a sampling frequency conversion circuit of FIG. 3.

FIG. 5 shows a construction of the sampling frequency conversion circuit 24 of FIG. 3. The sampling frequency conversion circuit 24 comprises a delay unit 51 for delaying by a predetermined interval the phase of the chrominance signal 23 having the frequency f2 and input from the digital modulator 22 via an input terminal 50; an adder 52 for adding an output from the delay unit 51 to the chrominance signal 23 not having its phase delayed: a multiplier 53 for multiplying an output of the adder 52 by ½. The delay unit 51, the adder 52 and the multiplier 53 constitute an interpolating filter indicated by a dashed line. The sampling frequency conversion circuit 24 further comprises a switch circuit 54 for switching between the input terminal 50 and an output terminal of the interpolating filter at the frequency f1.

The transfer function of the interpolating filter is given, for example, by $$H(z)=(\tfrac{1}{2}) \cdot (1+2 \cdot z^{-1}+z^{-2}) \quad (5)$$

A description will now be given of the operation of the digital color encoder having the above-described construction.

The RGB signals sampled at the sampling frequency f1 which is an integral multiple of an integral fraction of the frequency of the chrominance subcarrier are blended by the matrix circuit 11 according to the predetermined ratios assigned to each color component. Thus, the luminance signal Y and the color difference signals R-Y and B-Y are produced. The color difference signals R-Y and B-Y are input to the low-pass filters 12-1 and 12-2, respectively, and the luminance signal Y is input to the delay circuit 13.

The chrominance signals having the frequency f1 and subjected to band rejection by the low-pass filters 12-1 and 12-2 have the frequency thereof reduced by a factor of 0.2 by the switch circuit 21 so as to have the frequency f2. The resultant chrominance signals are input to the digital modulator 22.

The digital modulator 22 subjects the chrominance subcarrier to quadrature two-phase balanced modulation using the color difference signals having the frequency f2 and output from the switch circuit 21. As a result, the chrominance signal 23 having the frequency f2 is output from the digital modulator 22.

The chrominance signal 23 having the frequency f2 and output from the digital modulator 22 has its frequency doubled by the sampling frequency conversion circuit 24. Thus, the chrominance signal 14 having the frequency f1, which is the same as the original sampling frequency applied to the RGB signals, is output from the sampling frequency conversion circuit 24 and input to the adder 18.

The luminance signal having its phase delayed by the delay circuit 13 is directly fed to the input of the adder 18. The adder 18 computes a sum of the luminance signal delayed by the delay circuit 13, the chrominance signal 23 output by the sampling frequency conversion circuit 24 and the composite synchronizing signal 16 that conforms to the standard so as to produce and output the composite video signal 17.

Figure 6A:
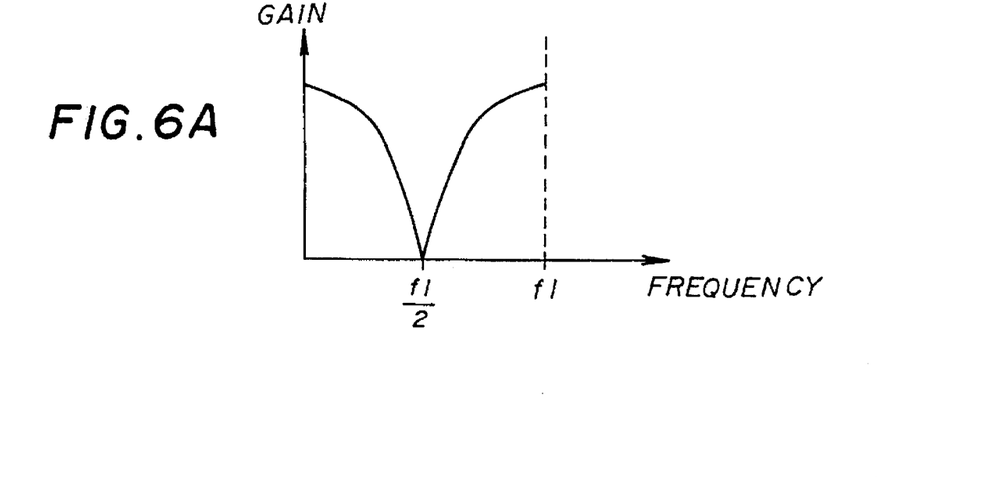
FIGS. 6A through 6C show power spectrums of signals that occur in the circuit of FIG. 3.
Figure 6B:
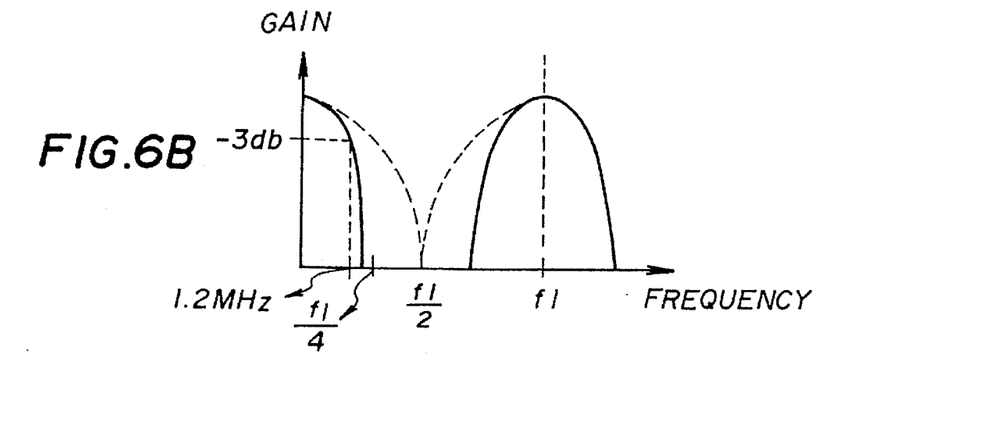
Figure 6C:
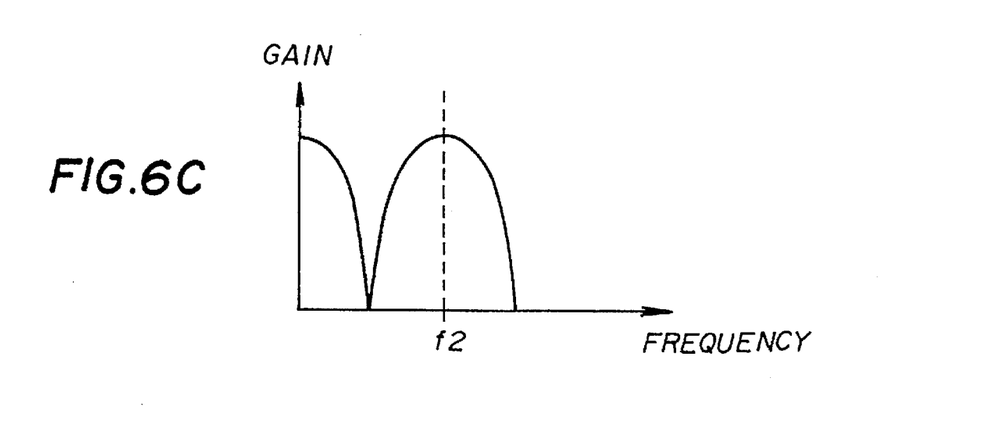

FIGS. 6A through 6C show frequency spectrums that occur in the circuit of FIG. 3. FIG. 6A shows a spectrum of the color difference signal R-Y output by the matrix circuit 11; FIG. 6B shows a spectrum of the color difference signal R-Y subjected to band-rejection by the low-pass filter 12-1; and FIG. 6C shows a spectrum of the color difference signal R-Y having its frequency reduced to ½ by the switch circuit 21.

As shown in FIG. 6A, the color difference signal R-Y has a frequency band f2=(f1)/2 before the band rejection. After the band rejection by the low-pass filter 12-1, the color difference signal R-Y exhibits the spectrum as shown in FIG. 6B. If the color difference signal R-Y component at a frequency (f1)/4 is reduced to such a level that it is not perceptible, a folding as shown in FIG. 6C does not take place within a perceptible range even when color difference data is reduced ½. The sampling frequency for reducing the color difference data to ½ is f2=(f1)/2. For example, if f1 is approximately 13.5 MHz, the color difference signal component at a frequency (f1)/4 is satisfactorily reduced. It is to be noted that this reduction depends on the characteristic of the low-pass filter 12-1.

Referring to FIG. 4, the multipliers 43 and 44 of the digital modulator 22 have to be operated at frequency f2=(f1)/2=6.75 MHz, instead of the 13.5 MHz. Accordingly, current consumption in the multipliers 43 and 44 is reduced as compared to the conventional construction. That the data in the cosine table ROM 41 and the sine table ROM 42 is obtained using the sampling frequency f2 means that the ROM capacity is half that of the conventional ROM tables. In this way, the circuit scale of the digital modulator 22 can be reduced.

Figure 7:
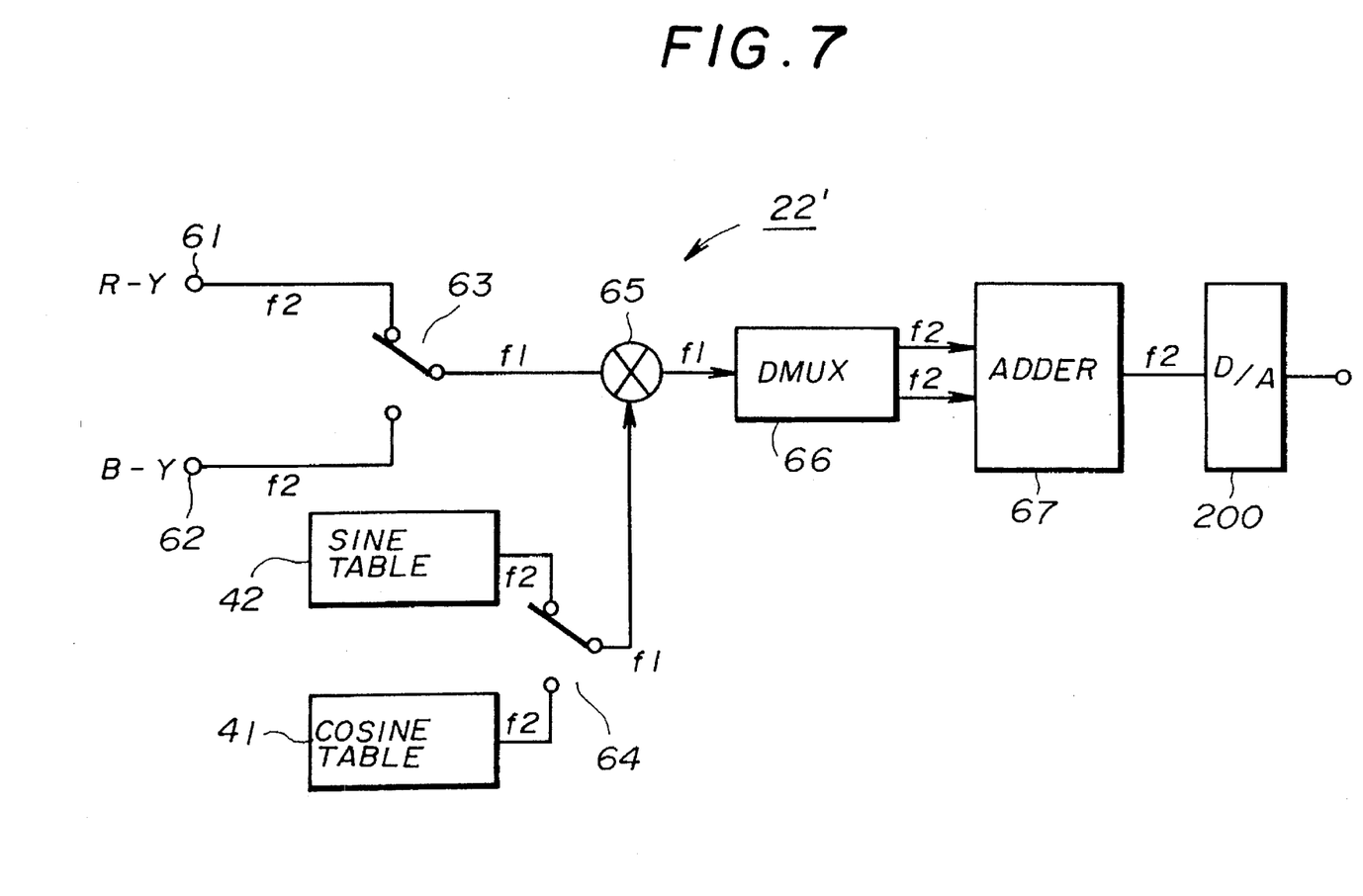
FIG. 7 is a block diagram showing another digital modulator employed in the construction of FIG. 3.

FIG. 7 shows another digital modulator 22' employed in the construction of FIG. 3. The digital modulator 22' comprises input terminals 61 and 62 to which the color difference signals R-Y and B-Y output by the preceding switch circuit 21 and having the frequency f2 are fed; a switch circuit 63 for importing the color difference signals R-Y and B-Y in a time-division scheme by switching between the input terminals 61 and 62 at the frequency f1; and a switch circuit 64 for importing the outputs of the cosine table ROM 41 and the sine table ROM 42 having the same construction as the corresponding table ROMs of FIG. 4 in a time-division scheme by switching between the two table ROMs at the frequency f1; a multiplier 65 operated at the frequency f1 so as to multiply an output from the switch circuit 63 by an output from the switch circuit 64; a demultiplexing circuit 66 for demultiplexing an output from the multiplier 65 having the frequency f1 so as to output the color difference signals R-Y and B-Y having the frequency f2; and an adder 67 for computing a sum of the color difference signals R-Y and B-Y.

The digital modulator 22' is designed to perform a time-division multiplexing by operating the multiplier 65 at the frequency f1. Unlike the conventional modulator, only a single, instead of two, multiplier has to be provided. Since the table ROMs are required to adapt for a reading operation conducted at the frequency f2, the required capacity is ½ that of the table ROMs of FIG. 4. Accordingly, the circuit scale of the digital modulator 22' can be relatively small.

While the reduction factor m is set to 2 in the above-described embodiment, other reduction factors may also be employed. If the sampling frequency for the input signals is high, the reduction factor m of 3 may be employed. In this way, it is possible to further reduce the circuit scale of the digital modulator.

In the embodiment described above, the chrominance signal 23 produced as a result of the 1/m frequency reduction and digital balanced modulation has its frequency multiplied by a factor of m by the sampling frequency conversion circuit 24 so that the chrominance signal 14 input to the adder 18 has the same frequency as the sampling frequency applied to the input signals. Alternatively, the sampling frequency conversion circuit may multiply the frequency of the input chrominance signal by a factor of n (integer) instead of m. For example, if the sampling frequency conversion circuit multiplies the frequency of the input chrominance signal by 4 so that the frequency of the resultant chrominance signal is twice as high as the original sampling frequency, it is possible to attain stability of the chrominance subcarrier. In this case, however, it is also necessary to convert the luminance signal Y so that its frequency is twice as high as the sampling frequency for the input signals, using the same circuitry as shown in FIG. 5.

A description will now be given, with reference to FIGS. 8 through 13, of a second embodiment of the present invention.

Figure 8:
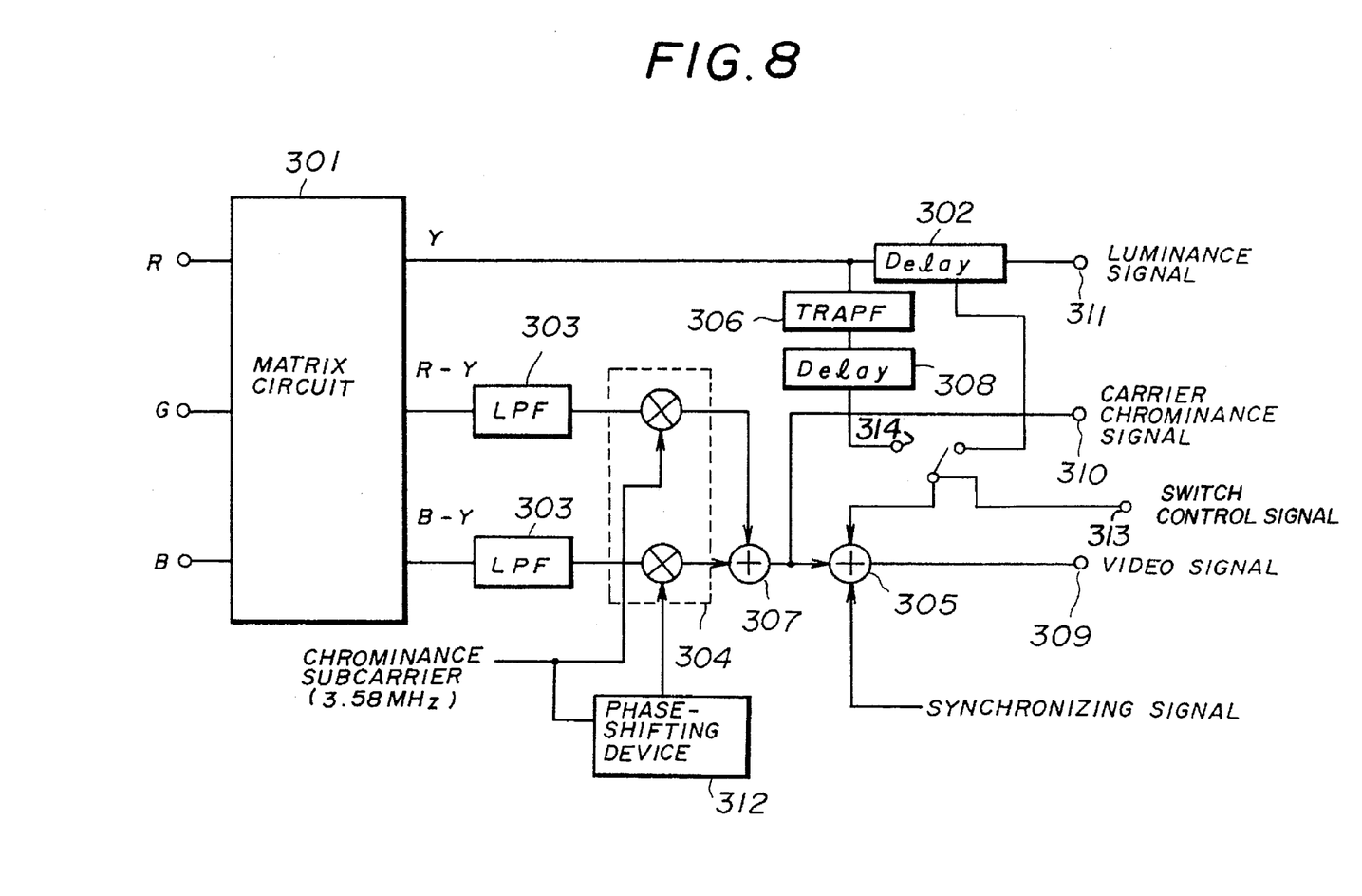
FIG. 8 is a schematic block diagram showing a construction of a digital color encoder according to a second embodiment of the present invention.

FIG. 8 is a schematic block diagram showing a construction of a digital color encoder according to a second embodiment of the present invention. A matrix circuit 301 is supplied by input means (not shown) with RGB signals sampled at a sampling frequency which is an integral multiple of an integral fraction of a chrominance subcarrier. The matrix circuit 301 is responsible for matrix operations for blending the RGB signals supplied by the input means using a predetermined ratio assigned to each color component, so as to produce a luminance signal Y, a color difference signal R-Y and a color difference signal B-Y. Low-pass filters 303 embodied by a digital filter apply band-rejection to the color difference signals R-Y and B-Y.

A modulator 304 is responsible for quadrature two-phase balanced modulation by which a chrominance subcarrier (3.58 MHz) is modulated by the color difference signal R-Y and the chrominance subcarrier having its phase shifted by a phase-shifting device 312 by a predetermined angle is modulated by the color difference signal B-Y. An adder 307 computes a sum of chrominance signals output from the modulator 304 and derived from the color difference signals R-Y and B-Y.

The digital color encoder of FIG. 8 is provided with a chrominance signal terminal 310 and a luminance signal terminal 311. The chrominance signal terminal 310 is connected to a path that carries the chrominance signal output by the adder 307. The luminance signal terminal 311 is connected to a path that carries the luminance signal output by the matrix circuit 301 and delayed by a delay circuit 302. The luminance signal delayed by the circuit 302 is fed to a switch 314. The luminance signal output from the matrix circuit 301 is fed to the input of a trap filter 306 embodied by a digital filter. The trap filter 306 is responsible for rejection of transmission of a luminance signal component which has the frequency of the chrominance subcarrier.

The switch 314 switches between an output from the delay circuit 302 and the luminance signal having its timing adjusted by the trap filter 306 and also by a delay circuit 308, in accordance with a switch control signal supplied via a switch control signal terminal 313. A delay time provided by the delay circuit 308 is set so as to cancel a difference between a delay time provided by the low-pass filters 303 and a delay time provided by the trap filter 306. An adder 305 computes a sum of the chrominance signal output form the adder 307 and the luminance signal selected by the switch 314 so as to synthesize a video signal (color composite signal) and supply the same to a video signal terminal 309. That is, the luminance signal output from the matrix circuit 301 and the chrominance signal output from the adder 307 can be output in addition to the aforementioned composite signal. The delay circuit 302 provides a delay that corresponds to a signal delay provided by the low-pass filters 303. It is to be noted that a digital-to-analog converter is omitted from the illustration in FIG. 8.

Figure 9:
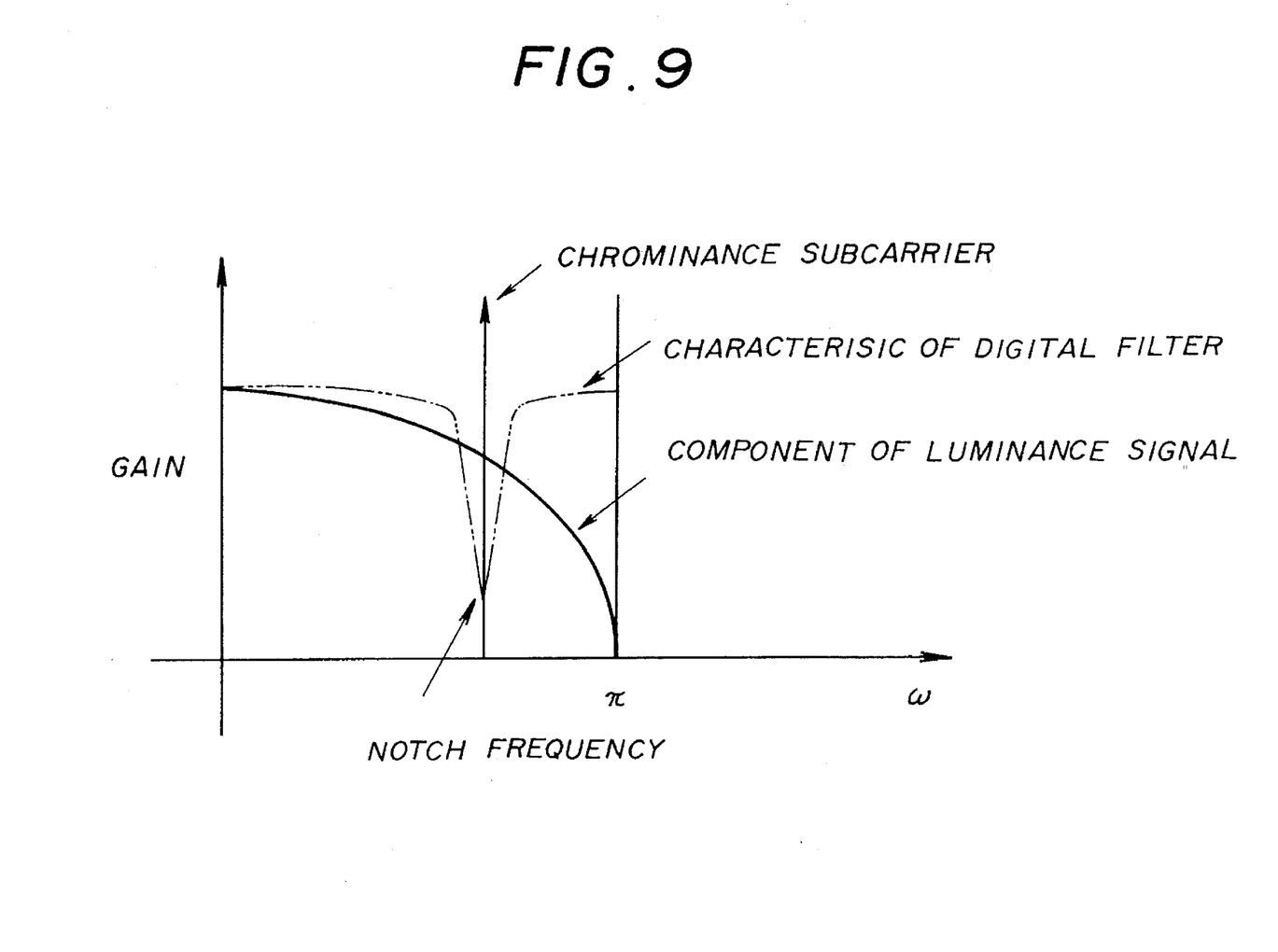
FIG. 9 is a graph showing a relationship between a characteristic of a trap filter and a characteristic of a luminance signal.

FIG. 9 is a graph showing a relationship between a characteristic (indicated by a broken line in the figure) of the trap filter 306 and a characteristic (indicated by a solid line in the figure) of the luminance signal. Frequencies are plotted horizontally using a normalized representation in which the sampling frequency is designated as $2\pi$. Gains are plotted vertically.

As shown in FIG. 9, the luminance signal contains in its bandwidth a component having the frequency of the chrominance subcarrier. However, since the notch frequency of the trap filter 306 is in the neighborhood of the frequency of the chrominance subcarrier (3.58 MHz), the aforementioned luminance signal component is satisfactorily reduced in its gain. Unlike analog filters, it is easy to construct a digital filter that embodies the trap filter 306 to have a linear phase and a sharply dropping characteristic. Accordingly, it is possible to limit to a minimum level a drop in resolution or contrast caused by a degradation in the characteristic of the luminance signal resulting from a filter operation. Since the group delay distortion is 0, no degradation in images due to a time difference between the luminance signal and the color difference signal occurs.

Figure 10:
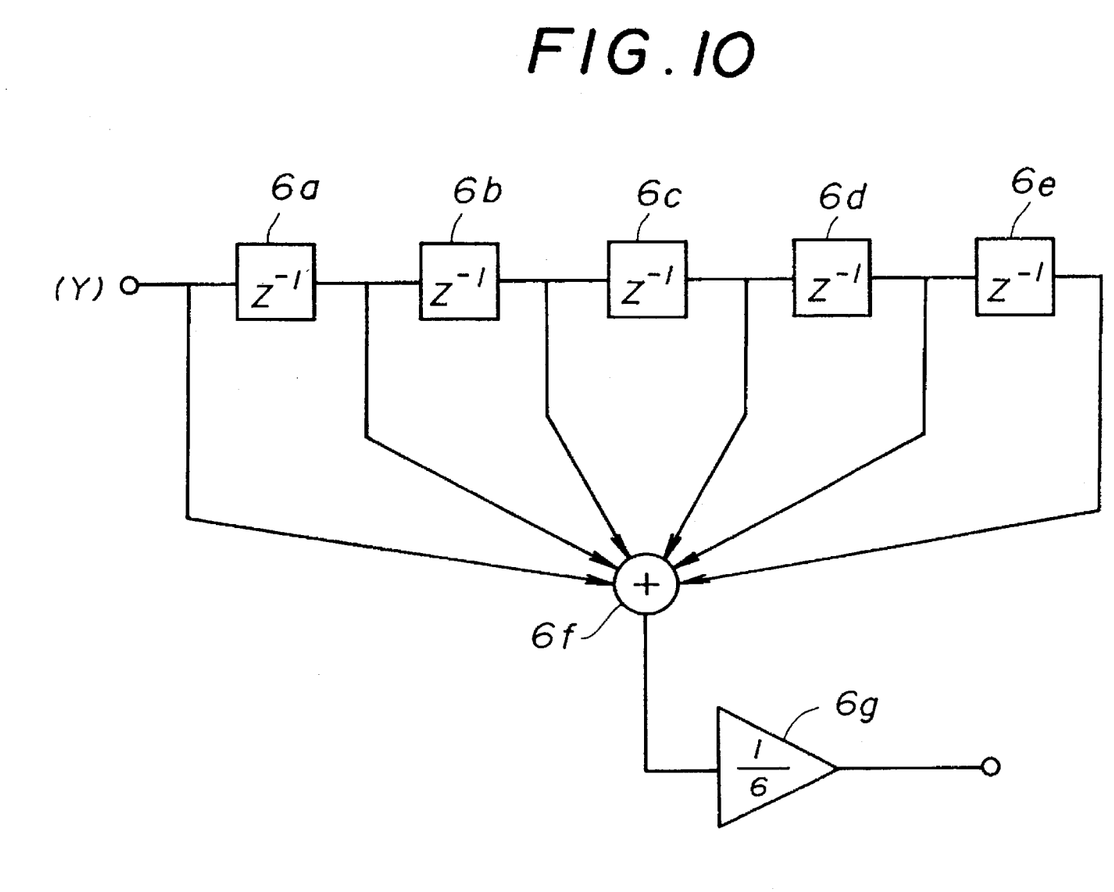
FIG. 10 is a circuit diagram showing a detailed construction of a trap filter used when the sampling frequency is configured to be 6 times the frequency of a chrominance subcarrier.

FIG. 10 is a circuit diagram showing a detailed construction of the trap falter 306 used when the sampling frequency is configured to be 6 times the frequency of the chrominance subcarrier. The trap filter 306 of FIG. 10 comprises five delay elements 6a–6e connected in series in a signal path that carries the luminance signal; an adder 6f for computing a sum of an input to the delay element 6a and outputs from the delay elements 6a–6e; and an operator 6g for computing an average of the input and the outputs by dividing the output of the adder 6f by 6. Thus, when the sampling frequency is an integral multiple of the chrominance subcarrier, the use of a moving average filter (comb filter) having a simple circuit construction ensures that the notch frequency matches the frequency of the chrominance subcarrier.

Each of the delay elements 6a–6e provides a delay $Z^{-1}$ equal to one sampling frequency period. The transfer function H(Z) of the trap filter 306 is given by $$H(Z)=(1+Z^{-1}+Z^{-2}+Z^{-3}+Z^{-4}+Z^{-5})/6 \quad (6)$$

The division by 6 of the output of the adder 6f carried out by the operator 6g can be effected by shifting since $\frac{1}{6}$ is approximated by $2^{-3}+2^{-5}+2^{-7}$. When the signal attenuation provided by a single trap filter 306 is insufficient, the trap filter 306 may be connected in series to form two or three filter stages so that a desired level of attenuation is obtained.

Figure 11:
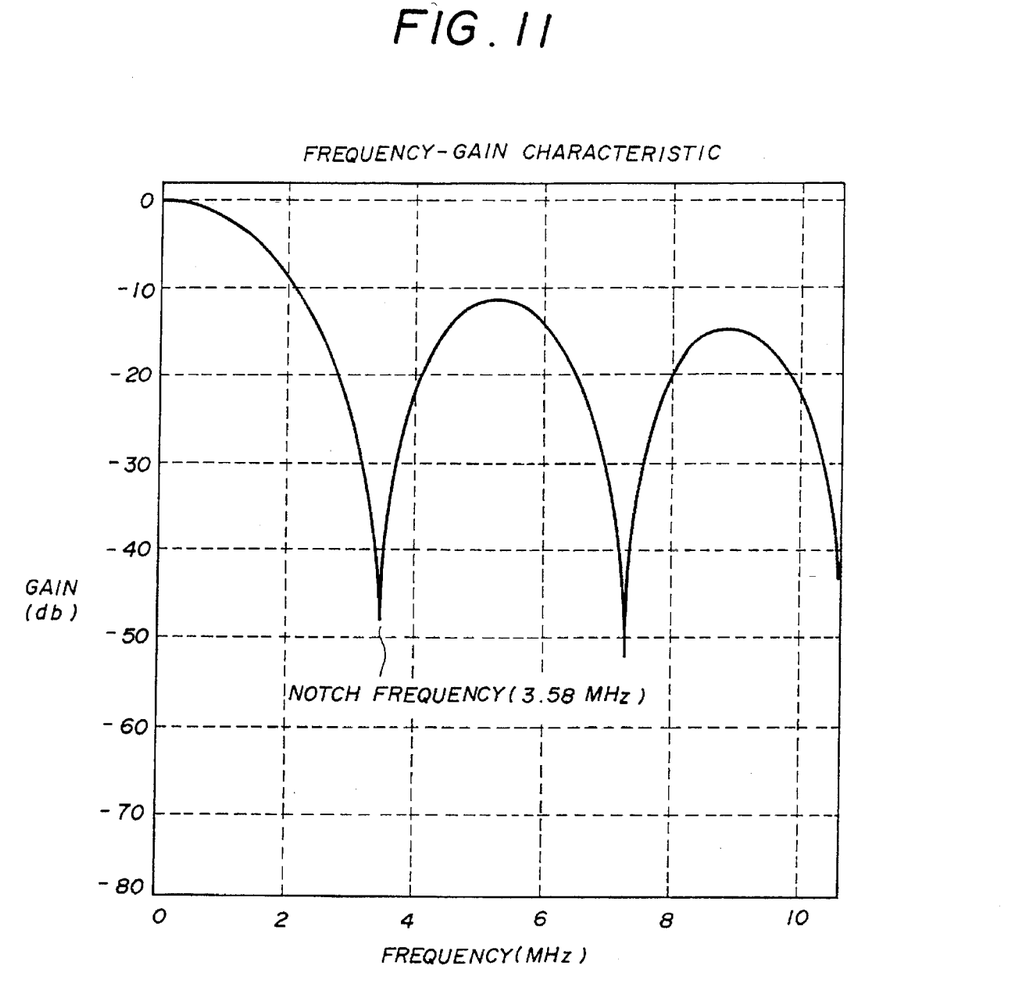
FIG. 11 is a graph showing a frequency-gain characteristic of a trap filter having the construction of FIG 10.

FIG. 11 is a graph showing a frequency-gain characteristic of the trap filter 306 having the construction of FIG. 10. Gains are plotted vertically and frequencies are plotted horizontally. The trap filter 306 has a linear phase characteristic and a group delay distortion of 0. The maximum frequency covered by the graph of FIG. 11 is 6/2 times the sampling frequency. It will be noted in FIG. 11 that, when the sampling frequency is configured to be an integral multiple of the chrominance subcarrier, luminance signal components in the neighborhood of the chrominance subcarrier frequency can be attenuated by the trap filter 306 having a construction of a moving average filter.

Figure 12:
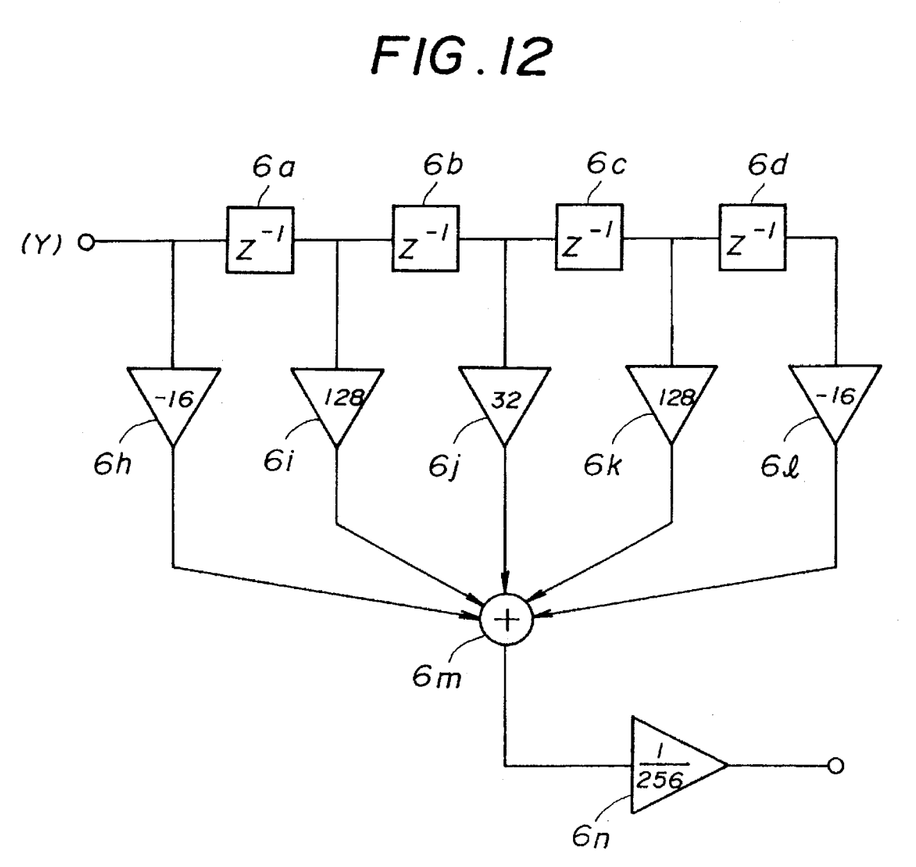
FIG. 12 is a circuit diagram showing a construction of the trap filter when the sampling frequency is configured to be 3.4 times the chrominance subcarrier frequency.

FIG. 12 is a circuit diagram showing a construction of the trap filter 306 when the sampling frequency is configured to be 3.4 (34/10) times the chrominance subcarrier frequency. The trap filter 306 of FIG. 12 comprises four delay elements 6a–6d connected in series in a signal path that carries the luminance signal; an operator 6h for multiplying by a predetermined coefficient an input of the delay element 6a; operators 6i–6l for multiplying by the predetermined coefficient outputs of the delay elements 6a–6d, respectively; an adder 6m for computing a sum of outputs of the operators 6h–6l; and an operator 6n for computing an average of the outputs of the operators 6h–6l by dividing the output of the adder 6m by 256.

Given that a delay provided by each of the delay elements is $Z^{-1}$, the transfer function H(Z) of the trap filter 306 is given by $$H(Z)=(-16+128Z^{-1}+32Z^{-2}+128Z^{-3}-16Z^{-4})/256 \quad (7)$$

The operators 6h–6l can easily be embodied by shifters. For example, the operation "–16" in the above equation can be effected by shifting an original value leftward by four bits so as to obtain a complement on two. A multiplication by "128" in the above equation can be effected by 7-bit leftward shifting; "32" by 5-bit leftward shifting; and "1/256" by eight-bit rightward shifting.

The circuit of FIG. 12 may be configured to adapt for the equation below which is a modification of the equation (7) providing the transfer function H(Z).

$$H(Z)=\{-1\times(1+Z^{-4})+8\times(Z^{-1}+Z^{-3})+2Z^{-2}\}/16$$

Figure 13:
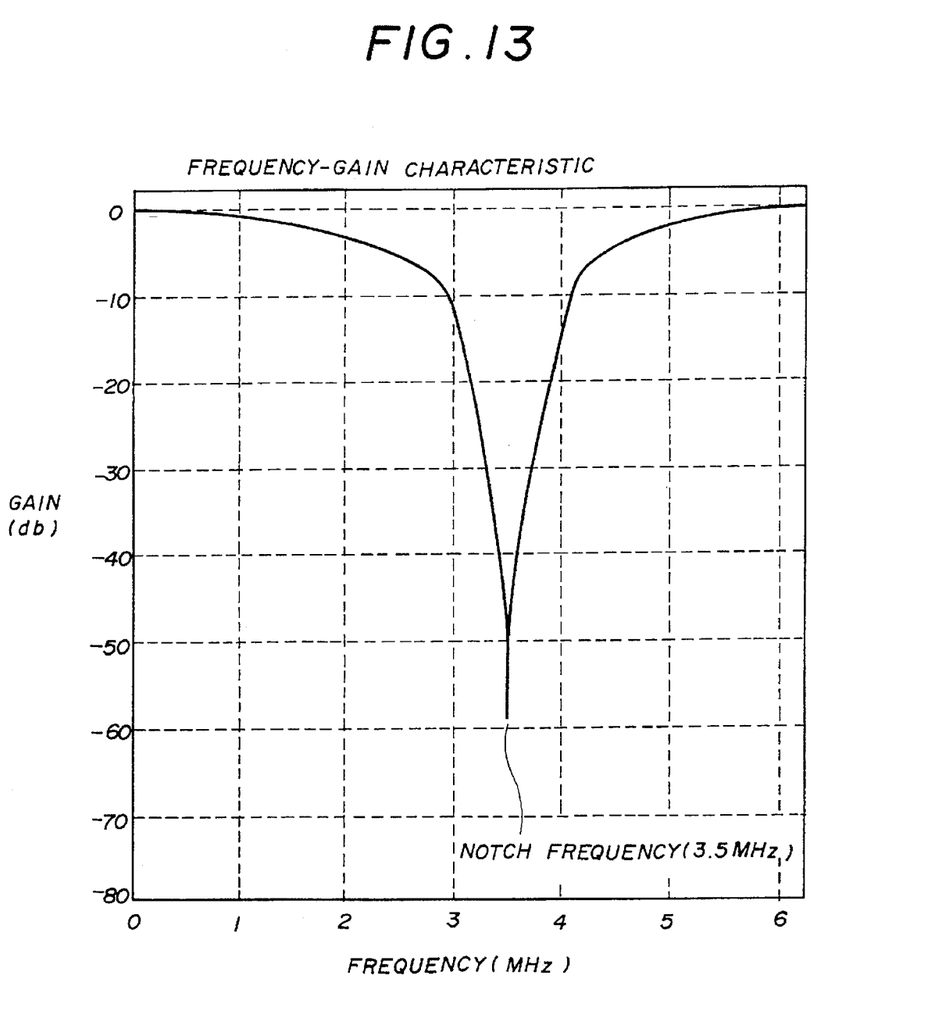
FIG. 13 is a graph showing a frequency-gain characteristic of the trap filter having the construction of FIG. 12.

FIG. 13 is a graph showing a frequency-gain characteristic of the trap filter 306 having the construction of FIG. 12. Gains are plotted vertically and frequencies are plotted horizontally. The maximum frequency covered by the graph of FIG. 13 is $\frac{1}{2}$ the sampling frequency ($=2\pi$). As will be noted from FIG. 13, when the sampling frequency is an integral multiple of an integral fraction of the chrominance subcarrier frequency, components in the luminance signal in the neighborhood of the chrominance signal subcarrier frequency can be attenuated using the linear-phase notch-type trap filter 306.

As has been described, a video signal (composite color signal) according to the present invention is produced based on the luminance signal having its components prevented from transmission in the neighborhood of the chrominance subcarrier frequency. It is ensured, in decoding the video signal, that the luminance signal components in the neighborhood of the chrominance subcarrier frequency are prevented from being included in the chrominance signal. Even when the receiver performs one-dimension Y/C separation, cross color is prevented from occurring.

Since the digital color encoder according to the second embodiment is constructed such that the luminance signal output from the matrix circuit 301 and the chrominance signal output from the modulator 304 are provided separately from the video signal. Therefore, the digital color encoder according to the second embodiment of the present invention is adapted for the S-terminal standard in which the luminance signal and the chrominance signal are transmitted via different channels. In the S-terminal configuration, the luminance signal not processed by the trap filter 306 is used so that a drop in contrast or resolution is prevented.

The digital color encoder of FIG. 8 may be elaborated such that there are provided a path that bypasses the trap filter 306 so as to connect the delay circuit 302 to the adder 305; and switch means for allowing a selection between the path and a path that connects the trap filter 306 and the adder 305. With this configuration, it is possible to selectively feed a signal processed by the trap filter 306 or a signal not processed by the trap filter 306 to the adder 305, thus allowing a user to choose between two requirements, that is, prevention of cross color and prevention of a drop in resolution or contrast.

While the description above gives an example in which the sampling frequency is 6 times the chrominance subcarrier frequency and an example in which the sampling frequency is 3.4 times the chrominance subcarrier frequency, cancellation of cross color is possible by attenuating the luminance signal components in the neighborhood of the chrominance subcarrier frequency, as long as the sampling frequency is an integral multiple of the chrominance subcarrier frequency or an integral multiple of an integral fraction of the chrominance subcarrier frequency. Although the second embodiment described above concerns the NTSC system, the present invention may also be applied to the PAL system.

The present invention is not limited to the above described embodiments, and variations and modifications may be made without departing from the scope of the present invention.

What is claimed is:

1. A digital color encoder for producing a composite color signal from RGB signals, comprising:
    input means for importing RGB signals sampled at a sampling frequency which is an integral multiple of a chrominance subcarrier frequency;
    signal synthesizing means for blending the RGB signals imported by the input means using a predetermined ratio assigned to each color component so to produce a luminance signal and color difference signals;
    a low-pass filter receiving the luminance signal for subjecting said color difference signals to band rejection;
    a band-reject digital filter for rejecting transmission of luminance signal components that correspond to the chrominance subcarrier frequency;
    modulating means for producing a chrominance signal having an arbitrary phase, based on the color difference signals outputted from the low-pass filter; and
    adding means for synthesizing a composite color signal by computing a sum of the luminance signal processed by the band-reject digital filter and the chrominance signal produced by the modulating means.

2. The digital color encoder as claimed in claim 1, wherein said band-reject digital filter is embodied by a linear-phase moving-average filter.

3. The digital color encoder as claimed in claim 1, wherein said band-reject digital filter is embodied by a linear-phase notch-type filter.

4. The digital color encoder as claimed in claim 1, further comprising, in addition to a terminal for outputting the composite color signal, a signal terminal for outputting the luminance signal not processed by the band-reject digital filter; and a signal terminal for outputting the chrominance signal output by the modulating means.

5. The digital color encoder as claimed in claim 1, further comprising a switch means for selectively feeding to the adding means the luminance signal not processed by the band-reject digital filter or the luminance signal processed by the band-reject digital filter.

6. A digital color encoder connected to a color television set, comprising:
    signal synthesizing means for blending RGB signals sampled at a predetermined sampling frequency which is a/b times a chrominance subcarrier frequency, where a and b are integers, so as to produce a luminance signal and two color difference signals;
    low-pass filters for subjecting said color difference signals to band rejection;
    switch means for reducing a size of color difference data in said color difference signals subjected to band-rejection by the low-pass filters so as to convert a sampling frequency of said color difference signals into 1/m of said sampling frequency of said color difference signals, where m is an integer;
    modulating means for synthesizing a chrominance signal having an arbitrary phase, based on the two color difference signals have the converted sampling frequency;
    sampling frequency conversion means for converting a frequency of said chrominance signal into said predetermined sampling frequency; and
    adding means for synthesizing a composite video signal by computing a sum of said luminance signal, the chrominance signal having said predetermined sampling frequency and a composite synchronizing signal that conforms to a predetermined standard.

7. The digital color encoder as claimed in claim 6, wherein said modulating means includes two multipliers operated at 1/m of said predetermined sampling frequency in processing said two color difference signals.

8. The digital color encoder as claimed in claim 6, wherein said modulating means includes a multiplier operated at said predetermined sampling frequency in processing said two color difference signals using a time-division scheme.

9. The digital color encoder as claimed in claim 6, wherein said sampling frequency conversion means multiplies the sampling frequency of said chrominance signal by a factor of n instead of m, where n is an integer,
    said digital color encoder further comprising luminance signal frequency conversion means for multiplying the sampling frequency of said luminance signal by a factor of n/m so that the sampling frequencies of said luminance signal and said chrominance signal are harmonized before the sum is produced by the adding means.

* * * * *